US010645399B2

(12) United States Patent
Jeon et al.

(10) Patent No.: US 10,645,399 B2
(45) Date of Patent: May 5, 2020

(54) METHOD AND APPARATUS FOR ENCODING/DECODING IMAGE (71) Applicant: INTELLECTUAL DISCOVERY CO., LTD., Seoul (KR)

(72) Inventors: Byeung Woo Jeon, Seongnam-si (KR); Kwang Hyun Won, Bucheon-si (KR); Seung Ha Yang, Suwon-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 733 days.

(21) Appl. No.: 14/906,937

(22) PCT Filed: Jul. 23, 2014

(86) PCT No.: PCT/KR2014/006720
§ 371 (c)(1),
(2) Date: May 2, 2016

(87) PCT Pub. No.: WO2015/012600
PCT Pub. Date: Jan. 29, 2015

(65) Prior Publication Data
US 2016/0269730 A1 Sep. 15, 2016

(30) Foreign Application Priority Data
Jul. 23, 2013 (KR) ........................ 10-2013-0086926
Jul. 23, 2014 (KR) ........................ 10-2014-0093585

(51) Int. Cl.
*H04N 19/176* (2014.01)
*H04N 19/12* (2014.01)
(Continued)

(52) U.S. Cl.
CPC ........... *H04N 19/176* (2014.11); *H04N 19/12* (2014.11); *H04N 19/127* (2014.11); *H04N 19/157* (2014.11); *H04N 19/70* (2014.11)

(58) Field of Classification Search
CPC .... H04N 19/00; H04N 19/176; H04N 19/157; H04N 19/127; H04N 19/12; H04N 19/70
(Continued)

(56) References Cited

U.S. PATENT DOCUMENTS

2008/0151995 A1 6/2008 Youn
2011/0096826 A1* 4/2011 Han ........................ H04N 19/52
375/240.01
(Continued)

FOREIGN PATENT DOCUMENTS

CN 103069800 A 4/2013
GB 2492333 A 1/2013
(Continued)

OTHER PUBLICATIONS

Cuiling Lan, et al., "Intra transform skipping," *Proceedings of the 9th Meeting of the Joint Collaborative Team on Video Coding (JCT-VC) of ITU-T SG 16 WP 3 and ISO/IEC JTC 1/SC29/WG 11*, Geneva, CH, Apr.-May 2012, pp. 1-11.
(Continued)

*Primary Examiner* — Tung T Vo
(74) *Attorney, Agent, or Firm* — NSIP Law (57) ABSTRACT The present invention relates to a method which can selectively skip a transform to alleviate problems of deterioration in compression rate and image quality which are mainly generated when applying the motion compensation-transform encoding image compression technique which is mainly used currently, to an image having a drastic spatial change in a pixel value such as a computer image, and can skip the transform by comparing a transform size of a current block and the size of a maximum transform skip block with each other, and provides an efficient signaling technique therefor. The method includes the steps of: comparing the size of a current transform unit (TU) with the size
(Continued)

of a maximum transform skip block when determining whether to transform a residual signal corresponding to difference between the current block and a prediction block; and determining whether to perform the transform on the basis of the comparison information on the size of the TU and the size of the maximum transform skip block.

14 Claims, 4 Drawing Sheets

(51) Int. Cl.
*H04N 19/157* (2014.01)
*H04N 19/127* (2014.01)
*H04N 19/70* (2014.01)

(58) Field of Classification Search
USPC .......................................... 375/240.1–240.29
See application file for complete search history.

(56) References Cited

U.S. PATENT DOCUMENTS

| | | | |
|---|---|---|---|
| 2011/0096829 A1* | 4/2011 | Han | H04N 19/44 375/240.02 |
| 2013/0188719 A1* | 7/2013 | Chen | H04N 19/52 375/240.16 |
| 2013/0329789 A1* | 12/2013 | Wang | H04N 19/463 375/240.12 |
| 2014/0003493 A1* | 1/2014 | Chen | H04N 19/597 375/240.02 |
| 2014/0003530 A1* | 1/2014 | Sole Rojals | H04N 19/129 375/240.18 |
| 2014/0022343 A1* | 1/2014 | Chen | H04N 19/70 348/43 |
| 2014/0023138 A1* | 1/2014 | Chen | H04N 19/597 375/240.12 |
| 2015/0071356 A1* | 3/2015 | Kim | H04N 19/513 375/240.16 |
| 2015/0110180 A1* | 4/2015 | An | H04N 19/44 375/240.12 |
| 2015/0172658 A1* | 6/2015 | Kim | H04N 19/176 382/238 |
| 2015/0181237 A1* | 6/2015 | Tsukuba | H04N 19/44 382/233 |
| 2015/0195576 A1* | 7/2015 | Yu | H04N 19/513 375/240.16 |
| 2015/0326863 A1* | 11/2015 | Francois | H04N 19/176 375/240.24 |
| 2017/0064336 A1* | 3/2017 | Zhang | H04N 19/61 |

FOREIGN PATENT DOCUMENTS

| | | |
|---|---|---|
| KR | 10-2012-0017012 A | 2/2012 |
| KR | 10-2012-0035126 A | 4/2012 |
| KR | 10-2012-0092533 A | 8/2012 |
| WO | WO 2013/058542 A1 | 4/2013 |

OTHER PUBLICATIONS

Kwanghyun Won, et al., "Transform skip based on minimum TU size," *Proceedings of the 14th Meeting of the Joint Collaborative Team on Video Coding (JCT-VC) of ITU-T SG 16 WP3 and ISO/IEC JTC 1/SC 29/WG 11*, Vienna, AT, Jul.-Aug. 2013, pp. 1-10.

Xiulian Peng, et al., "Non-RCE2: Transform skip on large TUs," *Proceedings of the 14th Meeting of the Joint Collaborative Team on Video Coding (JCT-VC) of ITU-T SG 16 WP 3 and ISO/IEC JTC 1/SC 29/WG 11*, Vienna, AT, Jul.-Aug. 2013, pp. 1-5.

International Search Report dated Nov. 3, 2014 in International Application No. PCT/KR2014/006720 (5 pages, with English translation).

Peng, X. et al., "Non-RCE2: Transform skip on large TUs," Proceedings from the 14th Meeting on Joint Collaborative Team on Video Coding (JCT-VC) of ITU-T SG 16 WP 3 and ISO/IEC JTC 1/SC 29/WG 11, Document No. JCTVC-N0288, held in Vienna, Austria, Jul. 25-Aug. 2, 2013 (5 pages).

Won, K. et al., "Transform skip based on minimum TU size," Proceedings from the 14th Meeting on Joint Collaborative Team on Video Coding (JCT-VC) of ITU-T SG 16 WP 3 and ISO/IEC JTC 1/SC 29/WG 11, Document No. JCTVC-N0167, held in Vienna, Austria, Jul. 25-Aug. 2, 2013 (10 pages).

Korean Office Action dated Jan. 31, 2016 in counterpart Korean Application No. 10-2014-0093585 (8 pages in Korean).

* cited by examiner

METHOD AND APPARATUS FOR ENCODING/DECODING IMAGE

CROSS-REFERENCE TO RELATED APPLICATIONS

This application is a U.S. National Stage Application of International Application No. PCT/KR2014/006720, filed on Jul. 23, 2014, which claims the benefit under 35 USC 119(a) and 365(b) of Korean Patent Application No. 10-2013-0086926, filed on Jul. 23, 2013 and Korean Patent Application No. 10-2014-0093585, filed on Jul. 23, 2014, in the Korean Intellectual Property Office, the entire disclosures of which are incorporated herein by reference for all purposes.

TECHNICAL FIELD

The present invention relates to the coding/decoding of an image and, more particularly, to a method and apparatus for determining whether or not to skip transform and performing coding/decoding.

BACKGROUND ART

In accordance with a motion compensation-transform coding image compression technique, such as H.264 or high efficiency image coding (HEVC), transform is always performed. However, the degree that video energy is concentrated on a low frequency is not great although transform is performed if the degree of change of a spatial pixel value within a corresponding block whose video will be compressed is very large or sharp. In a compression process, if a low frequency component is maintained and a high frequency component is removed or strong quantization is applied to the high frequency component, picture quality may be severely deteriorated. In particular, in the case of an artificial video produced by a computer, such a problem is significant. In this case, if transform is not performed and coding is performed in a spatial domain rather than performing transform uniformly as in an existing method, compression performance becomes better or the deterioration of picture quality can be significantly reduced. In the existing video compression methods, however, transform needs to be always performed regardless of the properties of video. If the existing video compression methods are applied, there is always a problem in that picture quality is deteriorated or a compression ratio is reduced.

In order to avoid such a problem, it may be considered to insert a flag indicative of whether or not to skip transform into compressed data so that whether or not to skip transform for each transform block is indicated. If the flag is sent for each transform block, however, another problem is generated because overhead consumed for signaling is increased.

As a solution for such a problem, there has been known a method for signaling a flag to determine whether or not to skip transform only when a current transform block size (TU size) is 4×4. In such a technology, transform is not skipped in a transform block greater than 4×4, and the execution of transform is selectively skipped only if a transform block is 4×4. Accordingly, a flag is sent only in the case of the 4×4 transform block. If the recently developed RQT technology is used, a transform block size suitable for each block can be determined adaptively and hierarchically using an RQT transform technology of multiple sizes divided in a quad tree. In such a technology, if it is determined that the effectiveness of transform is small as a result of the review of the characteristics of video within a specific block, such an inefficiency problem can be limited to some transform blocks by splitting a block into finer transform block sizes and performing transform. Since the smallest transform size is 4×4, split transform is no longer performed if a transform block size that is now taken into consideration is 4×4. Accordingly, even in this case, whether or not to skip transform is determined and a flag indicative of a result of the determination is transmitted so that a decoder is aware of whether or not to skip the execution of transform. In this case, there are advantages in that overhead consumed for a flag can be reduced and transform is skipped if the effectiveness of the transform is low.

Meanwhile, in current video compression technologies, each encoder autonomously may adaptively determine the smallest transform block size to be used by the decoder. In a specific application, the smallest transform block size may be determined to be another size, such as 8×8 or 16×16, other than 4×4. If the smallest transform block size (hereinafter referred to as an STU) determined by an encoder is 8×8 or more, a current technology has a technical disadvantage in that the execution of block transform cannot be skipped even under any circumstances. That is, in this case, since transform efficiency of a block within video is very low, a reduction of a compression ratio or the deterioration of picture quality must be endured because there is a problem in that transform cannot be skipped if a current technology is used although it is more advantageous to skip transform.

Meanwhile, the size of a transform block having the inefficiency problem of transform may be different in various ways depending on the characteristics of video. The inefficiency problem of transform may be commonly generated in the 4×4 transform block because the smallest transform block size is 4×4, but the inefficiency problem may be generated in an 8×8, 16×16, or 32×32 transform block size depending on the characteristics of video. That is, a problem, such as a reduction of a compression ratio or the deterioration of picture quality in some video, may be generated if the inefficiency problem is taken into account only in the 4×4 transform block and transform is skipped according to an existing technology.

DISCLOSURE

Technical Problem

An object of the present invention for solving the problems is to provide an encoder and decoder, which realize a function for checking whether the size of a current (transform) block is equal to or smaller than a maximum transform block size (this may be hereinafter referred to as a maximum transform skip block size) that may allow a transform skip determined by the encoder (or user) and determining whether or not to perform a transform (when encoding is performed) or inverse transform (when decoding is performed) process on the current transform block or skip the transform process.

Another object of the present invention is to provide an encoder and decoder, which can transfer information to define a Log2MaxTrafoSizeSkip value for indicating a maximum transform skip block size in a higher layer (e.g., it may be any one layer selected in a sequence parameter set (SPS), a picture parameter set (PPS), or a slice header) than residual coding data transmission and can more flexibly control whether or not to skip the execution of transform depending on whether the size of a current (transform) block is equal to or smaller than available Log2MaxTrafoSizeSkip determined by the encoder (or user).

Another object of the present invention is to provide an encoder and decoder, which realize a function for limiting a Log2MaxTrafoSizeSkip value so that the Log2MaxTrafoSizeSkip value is equal to or greater than the smallest transform block size (STU) determined by the encoder and for controlling whether or not to skip the execution of block transform (inverse transform in the case of the decoder) based on a result of the determination of the encoder although the STU is greater than 4×4.

Technical Solution

An image encoding method of the present invention for achieving the object may include the steps of comparing a current transform unit (TU) size with a value of a maximum transform skip block size when determining whether or not to skip transform for a residual signal corresponding to difference between a current block and a prediction block and determining whether or not to skip transform based on comparison information between the TU size and the value of the maximum transform skip block size.

The image encoding method may further include the step of encoding a flag indicative of a determination of whether or not to skip transform based on the comparison information.

The method for encoding the maximum transform skip block information may include one of a method 1) for including the value of the maximum transform skip block size itself in a bit stream, a method 2) for including a relative value of the maximum transform skip block size and the current TU size in the bit stream, and a method 3) for including a relative value of the maximum transform skip block size with regard to a value indicative of a determined smallest transform block size usable by an encoder in the bit stream.

The step of transmitting information to define the value of the maximum transform skip block size in a higher layer than residual coding data transmission may further included.

The higher layer may include a picture parameter set.

The higher layer may include at least one of a sequence parameter set and a slice header.

The value of the maximum transform skip block size may be set between the size of a smallest transform unit (STU) determined by an encoder and the size of the maximum transform block.

If the current TU size is equal to or smaller than the value of the maximum transform skip block size, whether or not to skip transform may be determined, and a flag indicative of a determination of whether or not to skip transform may be included in a bit stream and encoded.

If a flag indicative of whether a transform execution skip function itself is used is enabled, both transform and quantization are not determined to be not used in a coding unit (CU) level, and the current TU size is equal to or smaller than the value of the maximum transform skip block size, whether or not to skip transform may be determined, and a flag indicative of a determination of whether or not to skip transform may be included in the bit stream and encoded.

If the current TU size is greater than the value of the maximum transform skip block size, transform may be determined to be performed on the current transform block without generating a flag indicative of whether or not to skip transform.

The step of performing transform on the current transform block based on the determined transform method may be further included.

An image encoding apparatus of the present invention for achieving the object may include a comparison unit which compares a current transform unit (TU) size with a value of a maximum transform skip block size when determining whether or not to skip transform for a residual signal corresponding to difference between a current block and a prediction block and a determination unit which determines whether or not to skip transform based on comparison information between the TU size and the value of the maximum transform skip block size.

An image decoding method of the present invention for achieving the object may include the steps of comparing a current transform unit (TU) size and a value of a maximum transform skip block size when performing inverse transform on an inverse-quantized transform coefficient and determining whether or not to skip inverse transform for a current transform block based on comparison information between the TU size and the value of the maximum transform skip block size.

The maximum transform skip block information may be received in such a manner that 1) the value of the maximum transform skip block size itself is included in a bit stream, 2) a relative value of the maximum transform skip block size and the current TU size is included in the bit stream, or 3) a relative value of the maximum transform skip block size with regard to a value indicative of a determined smallest transform block size usable by an encoder is included in the bit stream.

The step of receiving information to define the value of the maximum transform skip block size in a higher layer than residual coding data transmission may be further included.

The higher layer may include a picture parameter set.

The higher layer may include at least one of a sequence parameter set and a slice header.

The value of the maximum transform skip block size may be set between the size of a smallest transform unit (STU) determined by an encoder and the size of the maximum transform block.

If the current TU size is equal to or smaller than the value of the maximum transform skip block size, a flag indicative of whether or not to skip inverse transform may be read, and inverse transform may be performed or the execution of inverse transform may be skipped based on a value of the flag.

If a flag indicative of whether an inverse transform execution skip function itself is used is enabled, both inverse transform and inverse quantization are not determined to be not used in a coding unit (CU) level, and the current TU size is equal to or smaller than the value of the maximum transform skip block size, a flag indicative of whether or not to skip inverse transform may be read, and inverse transform may be performed or the execution of inverse transform may be skipped based on a value of the flag.

If the current TU size is greater than the value of the maximum transform skip block size, a flag indicative of whether or not to skip inverse transform may not be read, and inverse transform may be performed on the current inverse transform block.

The step of performing inverse transform on the current transform block based on the determined inverse transform method may be further included.

An image decoding apparatus of the present invention for achieving the object may include a comparison unit which compares a current transform unit (TU) size and a value of a maximum transform skip block size when performing inverse transform on an inverse-quantized transform coefficient and a determination unit which determines whether or not to skip inverse transform for a current transform block based on comparison information between the TU size and the value of the maximum transform skip block size.

Advantageous Effects

In accordance with the present invention, coding efficiency can be improved and subjective picture quality can also be improved because a current TU size is compared with a Log2MaxTrafoSizeSkip value and information determining whether or not to skip inverse transform is signaled more flexibly and efficiently.

Furthermore, in accordance with the present invention, if the degree that video energy is concentrated on a low frequency is not great although transform is performed because the degree of change of a spatial pixel value within a corresponding block of video to be compressed is very large or sharp and if picture quality is severely deteriorated when a low frequency component is commonly maintained and a high frequency component is removed or strong quantization is applied in a compression process, a Log2MaxTrafoSizeSkip value is limited so that it is equal to or greater than the size of the STU, and whether or not to skip the execution of block transform is economically indicated without great overhead based on a determination of an encoder although the STU is greater than 4×4. Accordingly, there is an advantage in that a video compression ratio can be increased or the deterioration of picture quality can be minimized.

Such advantages become significant, in particular, in the case of an artificial video generated by a computer.

BEST MODE FOR CARRYING OUT THE INVENTION

The present invention may be modified in various ways and may be implemented to have several embodiments. Specific embodiments are illustrated in the drawings and are described in detail.

It is however to be understood that the present invention is not intended to be limited to the specific embodiments and the present invention includes all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Hereinafter, preferred embodiments of the present invention are described in more detail with reference to the accompanying drawings. In describing the present invention, in order to help general understanding, the same reference numerals are used to denote the same elements throughout the drawings, and a redundant description of the same elements is skipped.

Configuration of Image Encoding Apparatus

Figure 1:
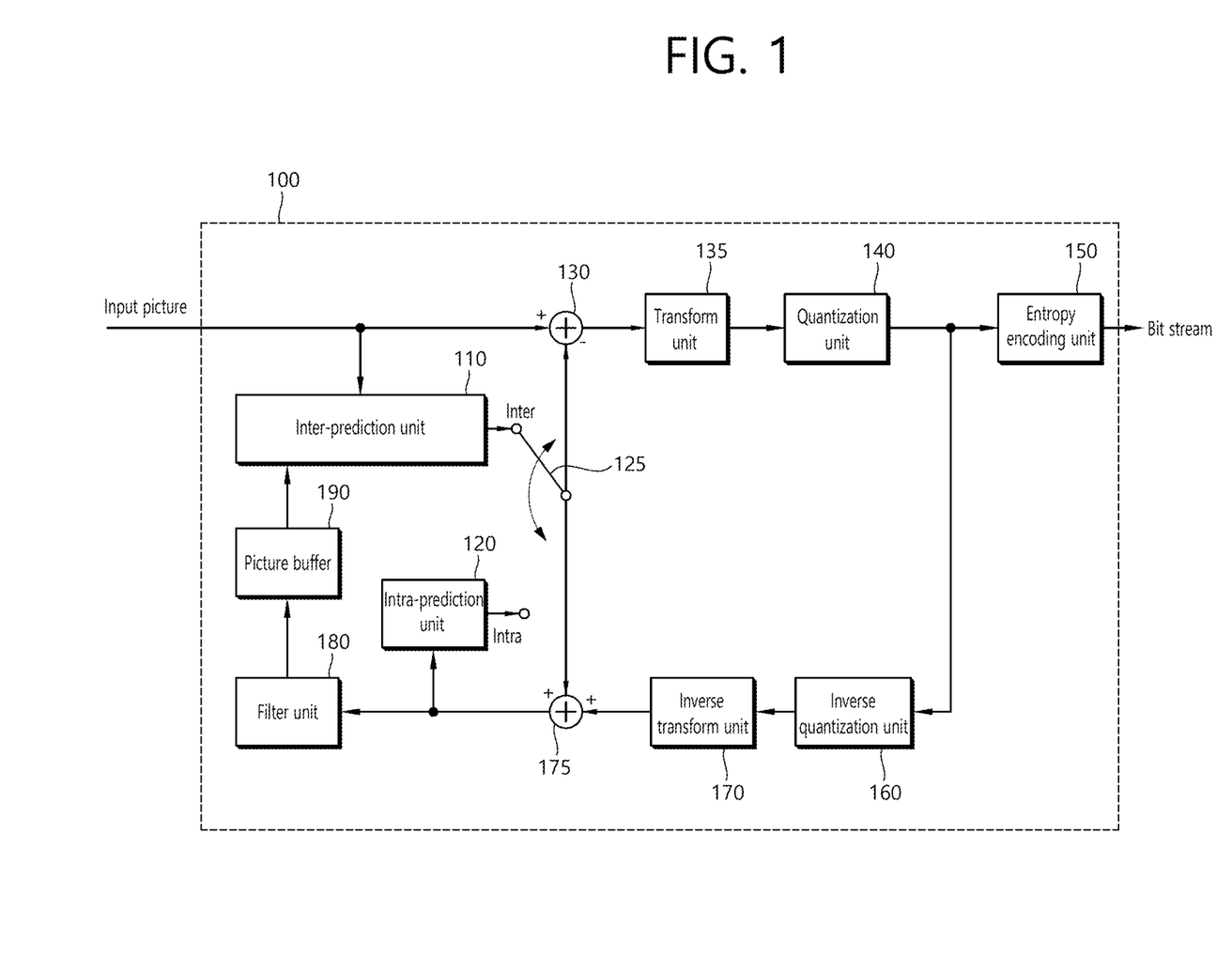
FIG. 1 is a block diagram showing the configuration of an image encoding apparatus according to an embodiment.

FIG. 1 is a block diagram showing the configuration of an image encoding apparatus according to an embodiment.

Referring to FIG. 1, the image encoding apparatus 100 includes an inter-prediction unit 110, an intra-prediction unit 120, a switch 125, a subtractor 130, a transform unit 135, a quantization unit 140, an entropy encoding unit 150, an inverse quantization unit 160, an inverse transform unit 170, an adder 175, a filter unit 180, and a picture buffer 190.

The image encoding apparatus 100 may perform encoding on an input image in intra-mode or inter-mode and output a bit stream. In the case of intra-mode, the switch 125 switches to intra-mode. In the case of inter-mode, the switch 125 switches to inter-mode. After generating a prediction block for an input block of the input image, the image encoding apparatus 100 may perform residual encoding on the input block and the prediction block.

In the case of intra-mode, the intra-prediction unit 120 may generate the prediction block by performing spatial prediction using the pixel values of an already coded block neighboring a current block.

In the case of inter-mode, the inter-prediction unit 110 may search a reference image, stored in the picture buffer 190, for a region corresponding to the input block in a motion estimation process and calculate a motion vector. The inter-prediction unit 110 may generate the prediction block by performing motion compensation using the motion vector and the reference image stored in the picture buffer 190.

The subtractor 130 may generate a residual block based on a difference between the input block and the generated prediction block. The transform unit 135 may perform transform on the residual block and output a transform coefficient. Furthermore, the quantization unit 140 may quantize the input transform coefficient based on a quantization parameter and output a quantized coefficient.

The entropy encoding unit 150 may perform entropy coding based on values calculated by the quantization unit 140 or an encoding parameter value calculated in a coding process and output a bit stream.

A current coded image needs to be decoded and stored in order to be used as a reference image because the image encoding apparatus 100 performs inter-prediction coding. Accordingly, a quantized coefficient may be subjected to inverse quantization in the inverse quantization unit 160 and may be subjected to inverse transform in the inverse transform unit 170. The inverse quantized and inverse transformed coefficient may be added to the prediction block through the adder 175, so a restored block may be generated.

The restored block experiences the filter unit 180. The filter unit 180 may apply one or more of a deblocking filter, a sample adaptive offset (SAO), and an adaptive loop filter (ALF) to the restored block or a restored picture. The restored block that has experienced the filter unit 180 may be stored in the picture buffer 190.

Configuration of an Image Decoding Apparatus

Figure 2:
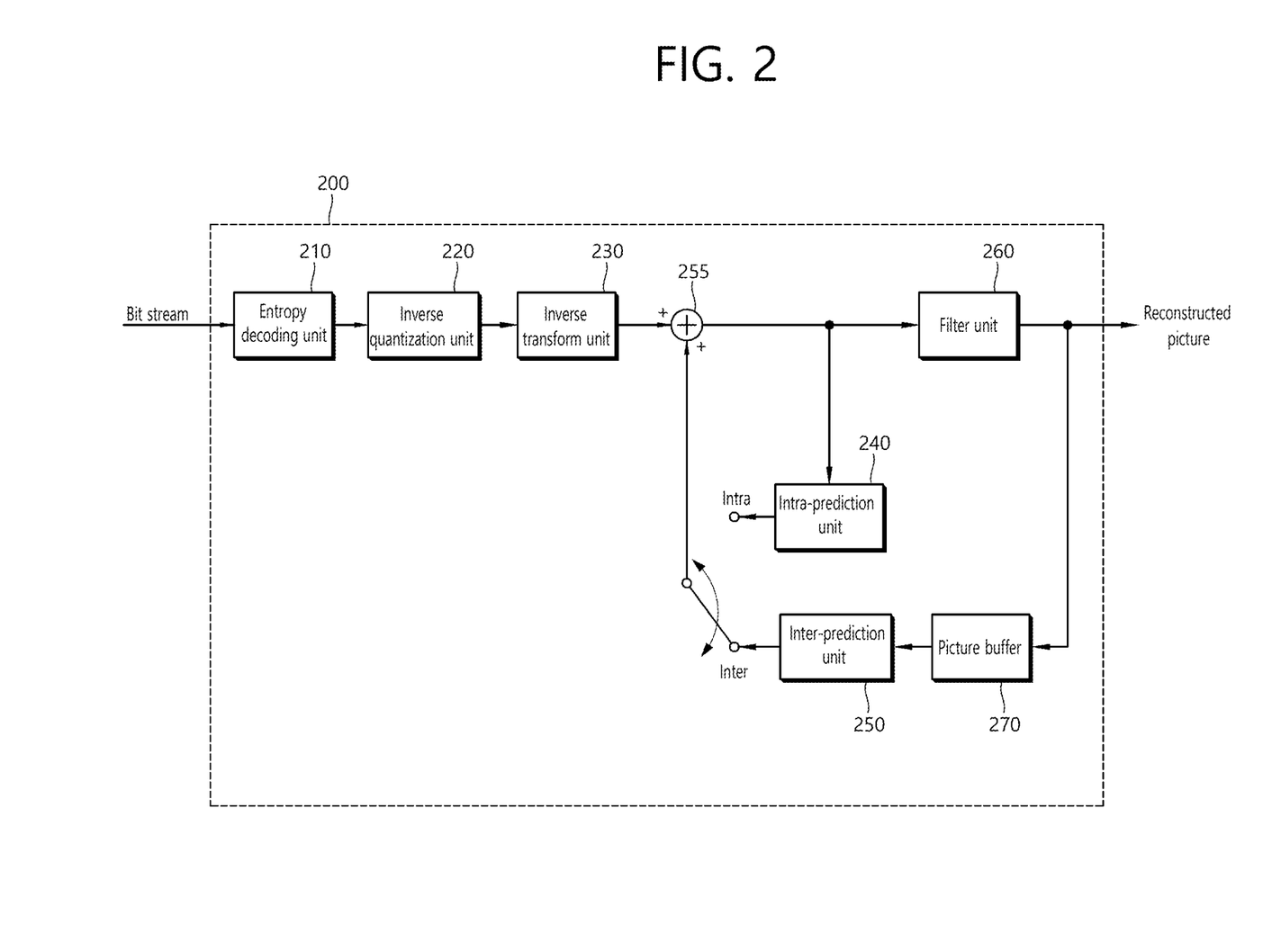
FIG. 2 is a block diagram showing the configuration of an image decoding apparatus according to an embodiment.

FIG. 2 is a block diagram showing the configuration of an image decoding apparatus according to an embodiment.

Referring to FIG. 2, the image decoding apparatus 200 includes an entropy decoding unit 210, an inverse quantization unit 220, an inverse transform unit 230, an intra-prediction unit 240, an inter-prediction unit 250, a filter unit 260, and a picture buffer 270.

The image decoding apparatus 200 may receive a bit stream output by the encoding apparatus, may perform decoding in intra-mode or inter-mode, and may output a reconstructed picture, that is, a restored picture. In the case of intra-mode, a switch may switch to intra-mode. In the case of inter-mode, the switch may switch to inter-mode.

After obtaining a reconstructed residual block from the inputted bit stream and generating a prediction block, the image decoding apparatus 200 may generate a reconstructed block, that is, a restored block by adding the restored residual block and the prediction block.

The entropy decoding unit 210 performs entropy coding on the inputted bit stream according to a probabilistic distribution. A quantized (transform) coefficient may be generated by entropy coding.

The quantized coefficient is subjected to inverse quantization in the inverse quantization unit 220 and subjected to inverse transform in the inverse transform unit 230. After the quantized coefficient is subjected to the inverse quantization/inverse transform, the restored residual block may be generated.

In the case of intra-mode, the intra-prediction unit 240 may generate the prediction block by performing spatial prediction using the pixel values of an already decoded block neighboring a current block.

In the case of inter-mode, the inter-prediction unit 250 may generate the prediction block by performing a motion compensation using a motion vector and a reference image stored in the picture buffer 270.

The restored residual block and the prediction block are added through an adder 255. The added block experiences the filter unit 260. The filter unit 260 may apply at least one of a deblocking filter, an SAO, and an ALF to the restored block or a restored picture. The filter unit 260 may output a reconstructed picture, that is, a restored picture. The restored picture may be stored in the picture buffer 270 and used for inter-prediction.

Hereinafter, a block may mean an image coding and decoding unit. Accordingly, in this specification, a block may mean a coding unit (CU), a prediction unit (PU), or a transform unit (TU) depending on circumstances. Furthermore, in this specification, a coding/decoding target block may be used as a meaning, including both a transform/inverse transform target block if transform/inverse transform is performed and a prediction target block if prediction is performed.

Common Residual Signal Transform Process

Meanwhile, a conventional encoder signals a flag determining whether or not to skip transform based on a current TU size when performing transform on a residual signal corresponding to difference between the original block and a prediction block.

If a current TU size is 4×4, the conventional encoder may signal a flag determining whether or not to skip transform. If a current TU size is greater than 4×4, the conventional encoder does not send a flag determining whether or not to skip transform (Accordingly, transform is always performed).

When a flag is 1, the decoder does not perform transform on a residual signal. When the flag is 0, the decoder performs transform on the residual signal.

In the prior art, a technology in which the execution of transform is selectively skipped is implemented as follows. Furthermore, in the prior art, information indicative of whether or not to skip transform is transmitted as follows.

In a Picture_parameter_set, whether the transform execution skip function itself is used is indicated by transform_skip_enabled_flag.

In this case, if transform_skip_enabled_flag=1, transform_skip_flag, that is, flag information indicative of whether or not to skip transform, is present in each residual block. The syntax of the residual block is listed in Table 1. As shown in Table 1, according to the prior art, transform_skip_flag may be present only when the size of a transform block is 4×4. That is, if the size of a transform block is greater than 4×4, there is a disadvantage in that the transform execution skip function cannot be basically used. Transform block data in which a value of transform_skip_flag is 1 does not experience an inverse transform process because it means that transform has been skipped in encoding. A more detailed description of transform_skip_flag is given in Table 2.

<residual_coding>

TABLE 1

| | Descriptor |
|---|---|
| residual_coding(x0,y0,log2TrafoSize,cIdx){ if(transform_skip_enable_flag && !cu_transquant_bypass_flag && (log2TrafoSize ==2)) tranform_skip_flag[x0[[y0][cIdx] . . . | ae(v) |

TABLE 2 transform_skip_flag[x0][y0][cIdx] specifies whether a transform
is applied to the associated transform block or not: The array indices
x0, y0 specify the location (x0, y0) of the top-left luma sample of the
considered transform block relative to the top-left luma sample of the
picture. The array index cIdx specifies an indicator for the colour
component; it is equal to 0 for luma, equal to 1 for Cb, and equal to 2
for Cr. transform_skip_flag[x0][y0][cIdx] equal to 1 specifies that
no transform is applied to the current transform block.
transform_skip_flag[x0][y0][cIdx] equal to 0 specifies that
the decision whether transform is applied to the current transform block
or not depends on other syntax elements.
When transform_skip_flag[x0][y0][cIdx] is not present, it is inferred to
be equal to 0.

Furthermore, an inverse transform procedure according to the prior art is shown in Table 3.

TABLE 3

The (nT)x(nT) array of residual samples r is derived as specified as
follows: If cu_transquant_bypass_flag is equal to 1, the (nT)x(nT) array
r is set equal to the (nT)x(nT) array of transform coefficients
TransCoeffLevel[xT][yT][cIdx]. Otherwise, the following ordered steps
apply: The scaling process for transform coefficients as specified in
subclause 8.6.3 is invoked with the transform block location (xT, yT), the
size of the transform block nT, the colour component variable cIdx and
the
quantization parameter qP as the inputs and the output is a (nT)x(nT)
array
of scaled transform coefficients d. The (nT)x(nT) array of residual samples
r is derived as follows. If transform_skip_flag[xT][yT][cIdx] is equal to
1, the residual sample array values r[x][y] with x= 0 . . . nT − 1,
y = 0 . . . nT − 1 are derived as: r[x][y] = (d[x][y] << 7) (8-265)
Otherwise (transform_skip_flag[xT][yT][cIdx] is equal to 0), the
transformation process for scaled transform coefficients as specified in
subclause 8.6.4 is invoked with the transform block location (xT, yT), the
size of the transform block nT, the colour component variable cIdx, and
the (nT)x(nT) array of scaled transform coefficients d as the inputs and
the output is a (nT)x(nT) array of residual samples r.

According to the prior art, if an STU set in a high level syntax is greater than 4×4 (i.e., if log 2TrafoSize>2), there is a problem in that the execution of transform cannot be skipped.

In order to solve the aforementioned problems, the present invention provides a method capable of determining whether or not to skip transform based on maximum transform skip block size determined by the encoder and skipping a transform process although the maximum transform skip block size determined by the encoder is variable.

The maximum transform skip block size is for a transform block size on which a transform process may be skipped. The maximum transform skip block size may be represented using a block size itself or using a logarithm value whose base is 2. For example, if a maximum transform skip block size is 16×16, the maximum transform skip block size=16 may be represented, or the maximum transform skip block size=log 2(16)=4 may be represented. In this specification, for convenience of simple description, an actual block size (e.g., an expression of 16×16 or 32×32) or a logarithm value of an actual block size (e.g., an expression of 4 or 5, that is, the logarithm value of a base 2 for 16 or 32) is interchangeably used to describe a maximum transform skip block size without doubt about a confusion. That is, for convenience of description, a maximum transform block size is indicated using a logarithm having a base of 2, and a value thereof is called Log2MaxTrafoSizeSkip. Such a description method for convenience of description is interchangeably used to denote the size of a block or transform block in the same manner in addition to a description of a maximum transform skip block size.

The encoder determine whether or not to skip transform if the size of a current block is equal to or smaller than a Log2MaxTrafoSizeSkip value and signals a corresponding information flag on a compressed bit stream (or data).

The decoder reads a flag indicative of whether or not to skip inverse transform from a compressed bit stream (or data) if the size of a current block is equal to or smaller than a Log2MaxTrafoSizeSkip value. The decoder skips the execution of inverse transform if a value of a flag is 1 and performs inverse transform if a value of the flag is 0 (the meaning of 0 and 1 regarding the execution of transform may be opposite depending on the definition of the value of the flag).

Image Encoding Method

Figure 3:
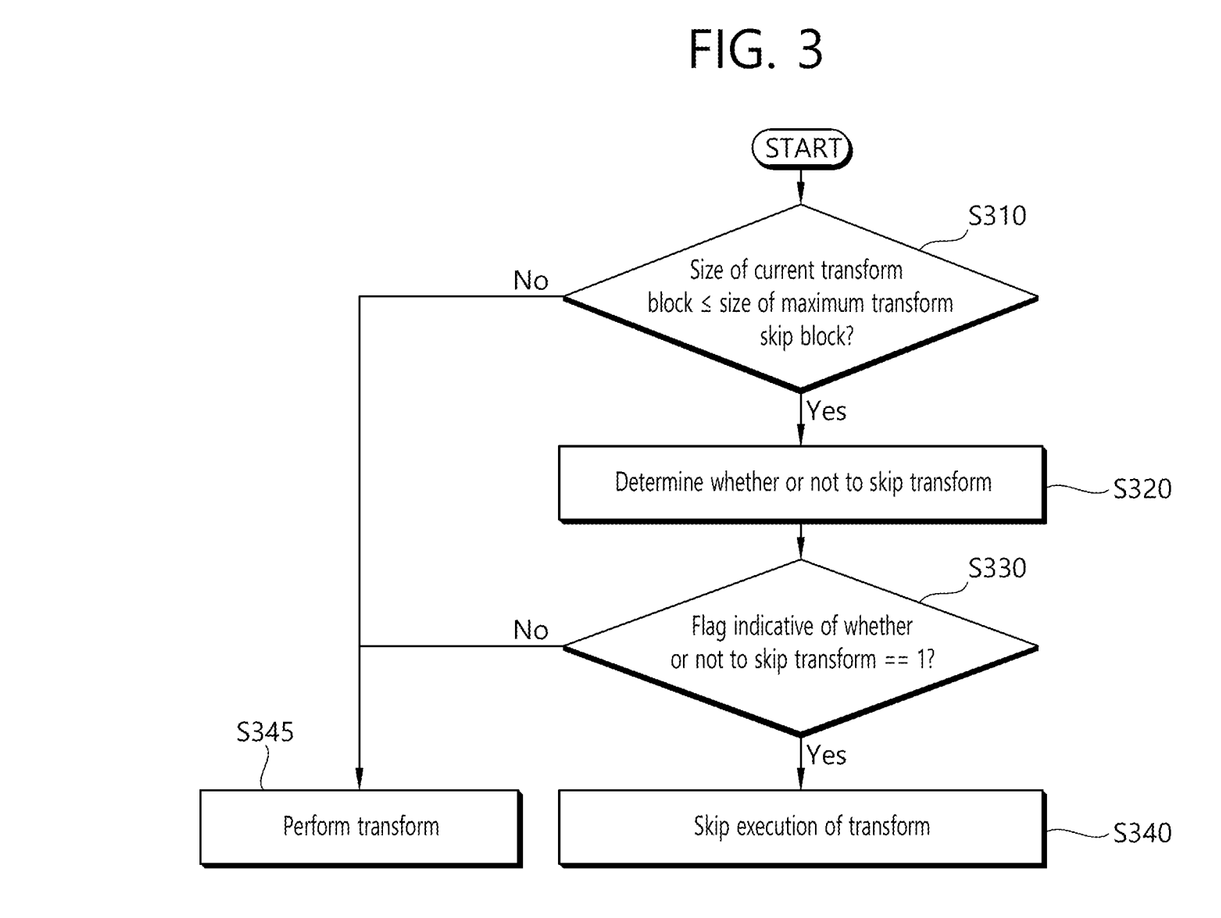
FIG. 3 is a flowchart schematically illustrating a method for determining whether or not to skip transform based on a maximum transform skip block size and performing coding in accordance with an embodiment of the present invention.

FIG. 3 is a flowchart schematically illustrating a method for determining whether or not to skip transform based on a maximum transform skip block size and performing coding in accordance with an embodiment of the present invention. Each of steps shown in FIG. 3 may be performed within a corresponding element of the image encoding apparatus described with reference to FIG. 1.

The encoder may generate a prediction block by performing intra-prediction or inter-prediction on a current coding target block and then obtain a residual signal corresponding to difference between the current coding target block and the prediction block. In this case, the encoder may perform a process for transforming the residual signal based on a transform block unit, and the process may be performed according to a method, such as that of FIG. 3.

First, in performing transform after obtaining the residual signal, the encoder compares the size of a current transform block with a value of a maximum transform skip block size (S310). The transmission of the value of the maximum transform skip block size is achieved by transferring a value of the maximum transform skip block size (Log2MaxTrafoSizeSkip) (or information capable of determining the value) in a higher layer (e.g., a picture parameter set, a sequence parameter set, or a slice header) than residual coding data transmission. The maximum transform skip block size adjusts a maximum TU size on which transform skip may be permitted.

Furthermore, the Log2MaxTrafoSizeSkip value is limited so that it is equal to or greater than the size of the smallest transform unit (STU) determined by the encoder, and whether or not to skip execution of block transform is controlled based on a determination of the encoder if the size of the STU is greater than 4×4. For example, if the size of the STU is 8×8, a maximum transform skip block size may start from 8×8 and may be set up top the size of a maximum transform block (e.g., this is assumed to be 32×32) (In this case, a Log2MaxTrafoSizeSkip value may be from 3 to 5). For example, in this case, a user or the encoder may determine Log2MaxTrafoSizeSkip to be 4. In this case, block transform may be skipped only for a block size of 8×8 or 16×16. Likewise, for another example, if the size of the STU is 16×16, a maximum transform skip block size may start from 16×16 and may be set up to 32×32, that is, the size of a maximum transform block (In this case, a Log2MaxTrafoSizeSkip value is from 4 to 5). If a user or the encoder has set Log2MaxTrafoSizeSkip=4, block transform may be skipped for only a block size of 16×16.

If the size of the current transform block is smaller than or equal to the maximum transform skip block size, the encoder determines whether or not to skip transform for the current transform block (S320). In this case, when transform is performed on the current transform block, the current transform block becomes transform block data. If transform is skipped, the current transform block may mean pixel domain data. That is, in order to avoid the ambiguity of a term, the term "transform block" is used as a concept comprehensively including the two concepts.

In this case, a flag may be used in order to provide notification of whether or not to skip transform for the current transform block. Furthermore, transform may be performed or skipped based on a value of the flag. If the current TU size is greater than the Log2MaxTrafoSizeSkip value, a flag providing notification of whether or not to skip transform is not signaled, and transform is always performed.

For example, transform_skip_flag, that is, a flag indicative of whether or not to skip transform, may be used. If a value of transform_skip_flag is 1, it may indicate that transform has been skipped without being performed on the current transform block. If a value of transform_skip_flag is 0, it may indicate that transform has been performed on the current transform block.

If the size of the current transform block is equal to or smaller than the maximum transform skip block size, a flag (e.g., transform_skip_flag) indicative of whether or not to skip transform may be encoded and transmitted to the decoder, based on the determination of whether or not to skip transform for the current transform block. In this case, if a value of a flag (e.g., transform_skip_flag) indicative of whether or not to skip transform is 1 (S330), the encoder skips the execution of transform for the current transform block (S340). If not, the encoder performs transform on the current transform block (S345).

Meanwhile, if, as a result of the determination at step S310, the size of the current transform block is greater than the maximum transform skip block size, the encoder performs transform on the current block (S345). In this case, a flag (e.g., transform_skip_flag) indicative of whether or not to skip transform is not encoded, and the flag information is not transmitted to the decoder.

Configuration of a Bit Stream

A bit stream according to the present invention is configured as follows.

TABLE 4

| | Descriptor |
|---|---|
| residual_coding(x0,y0,log2TrafoSize,CIdx) if(transform_skip_enabled_flag && !cu_transquant_bypass_flag && (log2TrafoSize <= Log2MaxTrafoSizeSkip)) transform_skip_flag[x0][y0][cIdx] . . . | |

In this case, the encoder needs to notify the decoder of Log2MaxTrafoSizeSkip information. Implementation methods for indicating information indicative of the maximum transform skip block size (or Log2MaxTrafoSizeSkip) in a compressed bit stream may be various.

A first realization example is a method for indicating the Log2MaxTrafoSizeSkip value itself in a bit stream without any changes. Syntax information for such a method is called log 2_max_transform_block_size_transform_skip. For example, if a maximum transform block size on which transform skip may be permitted is 4×4, a logarithm value in which the base of 4, that is, the length of one side of a transform block, is 2 is 2. Accordingly, the first realization example is a realization method for setting a syntax element, that is, log 2_max_transform_block_size_transform_skip, in a compressed bit stream and sending 2 as the value of the syntax element (Method 1).

Another realization method for indicating information indicative of the maximum transform skip block size (or Log2MaxTrafoSizeSkip) in a compressed bit stream is as follows. A relative value of a maximum transform skip block size with regard to a 4×4 transform block size may be represented as a logarithm value whose base is 2. The value is called log 2_max_transform_skip_block_size_minus2. A detailed example of this is as follows. If a maximum transform block size on which transform skip may be permitted is 8×8, logarithm values in which bases of 8 and 4 are 2 are 3 and 2, respectively, and a difference between 3 and 2, that is, 3−2, is 1. Accordingly, this method is a realization method for setting a syntax element called log 2_max_transform_skip_block_size_minus2 in a compressed bit stream and sending 1 as the value of the syntax element (Method 2). Method 2 is convenient because the log 2_max_transform_skip_block_size_minus2 value has a property that it is not a negative number and thus a possibility that the value may be erroneously set can be reduced when encoding is performed.

Another realization method for indicating information indicative of the maximum transform skip block size (or Log2MaxTrafoSizeSkip) in a compressed bit stream is as follows. A relative value of a maximum transform block size with regard to a value indicative of the smallest transform block size (an expression of the value in logarithm is assumed to be Log2MinTrafoSize) determined by the encoder may be indicated (this is called an offset value, for convenience sake). In this case, the offset value may be indicated without any change. Alternatively, the value may be represented as a logarithm value whose base is 2 (a syntax element in which the value is indicated in a bit stream is called log 2_max_transform_block_size_transform_skip_minus_min_transform). A detailed example of this is as follows. If a maximum transform block size on which transform skip may be permitted is 8×8 and an available smallest transform block size determined by the encoder is 4×4, logarithm values in which the bases of 8 and 4 are 2 are 3 and 2, respectively, and a difference between 3 and 2, that is, 3−2, is 1. Accordingly, this method is a realization method for indicating the offset value (or a value of the syntax element of log 2_max_transform_block_size_transform_skip_minus2) as 1 (Method 3). Like Method 2, Method 3 is convenient because the offset value (or log 2_max_transform_block_size_transform_skip_minus_min_transform) has a property that it is not a negative number and thus a possibility that the value may be erroneously set can be reduced when encoding is performed.

The Log2MaxTrafoSizeSkip information may be finally determined as one of the following equations using information transferred through a corresponding value of compression data or a bit stream through such various realization examples.

Log2MaxTrafoSizeSkip=log 2_max_transform_block_size_transform_skip

Log2MaxTrafoSizeSkip=log 2_max_transform_skip_block_size_minus2+2

Log2MaxTrafoSizeSkip=Log2MinTrafoSize+log 2_max_transform_block_size_transform_skip_minus_min_transform For convenience of description, to indicate Log2MaxTrafoSizeSkip information using log 2_max_transform_skip_block_size_minus2 in an example in which the configuration of the bit stream of Table 6 is indicated is basically described.

The size of a current block on which transform will be performed is N=$2^{(\log 2TrafoSize)}$ according to the above syntax. In this case, a transform block size (i.e., a TU size) is N×N. Information indicative of the maximum transform skip block size (Log2MaxTrafoSizeSkip) is indicated using the following syntax element (log 2_max_transform_skip_block_size_minus2) whose use is permitted in Picture_parameter_set. In this case, the size of Log2MaxTrafoSizeSkip is determined as follows.

Log2MaxTrafoSizeSkip=log 2_max_transform_skip_block_size_minus2+2

In accordance with an embodiment of the present invention, log 2_max_transform_skip_block_size_minus2 is limited as in the following equation.

$$\text{log 2\_max\_transform\_skip\_block\_size\_minus2} \geq \text{log 2\_min\_transform\_block\_size\_minus2} \quad (1)$$

In this case, the syntax element ("log 2_min_transform_block_size_minus2") is information indicative of the size of the smallest transform block (STU) whose use is permitted by the encoder and which is indicated in the sequence parameter set (Sequence_parameter_set).

An realization example in which the syntax element (log 2_max_transform_skip_block_size_minus2) is indicated in a bit stream is as follows (as a more detailed realization example, a method for indicating the syntax element in a picture parameter set (Picture_parameter_set) layer is shown)

TABLE 5

Picture_parameter_set
...
transform_skip_enabled_flag
if (transform_skip_enabled_flag)
log2_max_transform_skip_block_size_minus2
...

transform_skip_enabled_flag, that is, the syntax element of Table 5, is a flag to notify the decoder whether the transform skip function itself is used or not. If the transform skip function itself is disabled in a given picture (if transform_skip_enabled_flag=0), transform has only to be performed by not specifically taking into consideration whether or not to skip transform. Accordingly, log 2_max_transform_skip_block_size_minus2 information is not transmitted. That is, only when transform_skip_enabled_flag=1, log 2_max_transform_skip_block_size_minus2 information is transmitted (from the standpoint of the encoder). From the standpoint of the decoder, that is, only when transform_skip_enabled_flag=1, the decoder reads log 2_max_transform_skip_block_size_minus2 information from a bit stream.

As another realization example in which the log 2_max_transform_skip_block_size_minus2 syntax element in a bit stream, a method for indicating the log 2_max_transform_skip_block_size_minus2 syntax element in the Sequence_parameter_set layer is as follows.

TABLE 6

Sequence_parameter_set
...
log2_max_transform_skip_block_size_minus2
...

In the realization example in which the above information is indicated in the Sequence_parameter_set layer, information about the skip of block transform, such as FIG. 7, may be transmitted.

TABLE 7

Picture_parameter_set
...
transform_skip_enabled_flag
...

In the two realization examples, an example in which log 2_max_transform_skip_block_size_minus2 information is transmitted in order to indicate a Log2MaxTrafoSizeSkip value has been basically described. Likewise, if log 2_max_transform_block_size_transform_skip or log 2_max_transform_block_size_transform_skip_minus_min_transform, that is, the aforementioned another realization method, is used in order to indicate a Log2MaxTrafoSizeSkip value, the same realization may be possible in such a way as to replace corresponding log 2_max_transform_skip_block_size_minus2 information in the two realization examples.

The process of performing encoding according to the present invention is summarized as follows. If transform_skip_enabled_flag is disabled (i.e., 0), a transform skip process is not performed because block transform skip itself for a corresponding picture has been fully disabled.

1 step: a residual signal corresponding to difference between a current block and a prediction block is received.

2 step: a current TU size is compared with a Log2MaxTrafoSizeSkip value.

3 step: if the current TU size is equal to or smaller than the Log2MaxTrafoSizeSkip value, the following is performed.

3-1 step: Whether or not to skip block transform is determined.

3-2 step: A flag indicative of a determination of whether to skip determined block transform is signaled on a compressed bit stream (if the execution of transform is determined, a flag=1 is signaled. If transform skip is determined, a flag=0 is signaled).

4 step: If the current TU size is greater than the Log2MaxTrafoSizeSkip value or if the execution of block transform is determined, transform is performed (in this case, if the current TU size is greater than the Log2MaxTrafoSizeSkip value, a flag is not signaled). In this case, if transform skip is determined, transform is not performed.

Image Decoding Method

Figure 4:
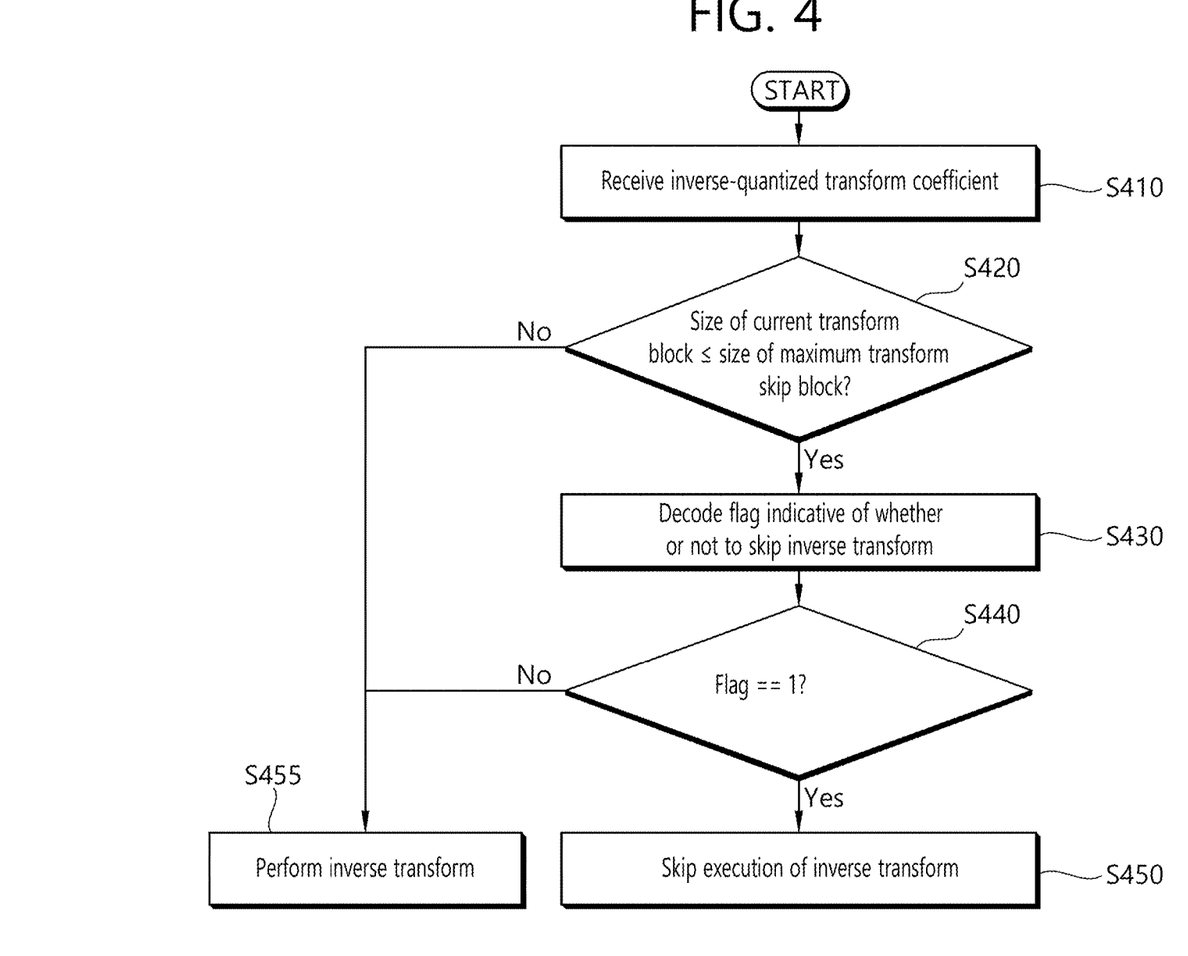
FIG. 4 is a flowchart schematically illustrating a method for determining whether or not to skip inverse transform based on a maximum transform skip block size and performing decoding in accordance with an embodiment of the present invention.

FIG. 4 is a flowchart schematically illustrating a method for determining whether or not to skip transform based on a maximum transform skip block size and performing decoding in accordance with an embodiment of the present invention. Each of steps of FIG. 4 may be performed within a corresponding element of the image decoding apparatus described with reference to FIG. 2.

Referring to FIG. 4, the decoder receives an inverse-quantized transform coefficient (S410). The inverse-quantized transform coefficient is a transform coefficient if it is subjected to inverse transform or it is the data in a pixel domain if inverse transform is skipped. Accordingly, in this specification, the inverse-quantized transform coefficient may be used as a meaning comprehensively including a transform coefficient when inverse transform is performed and the data value in a pixel domain when inverse transform is skipped.

Furthermore, the decoder compares the size of a current transform block with a maximum transform skip block size (S420). As in the encoder above, the current transform block becomes transform block data when inverse transform is performed, but may mean pixel domain data when inverse transform is skipped. That is, in order to avoid the ambiguity of a term, the term "transform block" is used as a concept comprehensively including the two concepts.

Furthermore, the decoder compares the size of the current transform block with the maximum transform skip block size (S420). That is, the decoder decodes information about the maximum transform skip block size received from the encoder and determines whether the size of the current transform block is equal to or smaller than the maximum transform skip block size. For example, if information about the maximum transform skip block size has been represented in "log 2_max_transform_skip_block_size_minus2", "log 2_max_transform_skip_block_size_minus2" information may be decoded, and the maximum transform skip block size (log 2_max_transform_skip_block_size_minus2+2) may be then compared with the size of the current transform block (log 2TrafoSize). In this case, an example in which the maximum transform skip block size information has been received as "log 2_max_transform_skip_block_size_minus2" has been described, but the same realization is possible in such a way as to replace "log 2_max_transform_skip_block_size_minus2" information when "log 2_max_transform_block_size_transform_skip" or "log 2_max_transform_block_size_transform_skip_minus_min_transform" is used.

If the size of the current transform block is equal to or smaller than the maximum transform skip block size, the decoder may decode a flag (e.g., transform_skip_flag) indicative of whether or not to skip inverse transform (S430).

The decoder determines whether the decoded flag (e.g., transform_skip_flag) information is 1 (S440) and performs inverse transform (S450) or skips an inverse transform process (S455) based on as a result of the determination.

For example, if the decoded flag indicates that a transform process has been skipped (e.g., if a value of transform_skip_flag is 1) (S440), the decoder does not perform inverse transform (S450). If the decoded flag indicates that transform has been performed (e.g., if a value of transform_skip_flag is 0) (S440), the decoder performs inverse transform (S455).

Meanwhile, if the size of the current transform block is greater than the maximum transform skip block size at step S420, the decoder does not decode a flag (e.g., transform_skip_flag) indicative of whether or not to skip inverse transform and may perform inverse transform on the current transform block (S455).

The present invention may provide a method for indicating whether or not to use a function itself for skipping a transform process based on a maximum transform skip block size, such as that described with reference to FIG. 3, and a function itself for skipping an inverse transform process based on a maximum transform skip block size, such as that described with reference to FIG. 4. For example, the encoder may use a flag indicative of whether or not to use a transform process skip function based on a maximum transform skip block size. In a decoding process, an accurate inverse process needs to be performed in accordance with a coding process. If a flag indicative of whether or not to use the transform process skip function based on a maximum transform skip block size indicates that the transform process skip function is used in the coding process, likewise, it means that an inverse transform process skip function is used based on a maximum transform skip block size in the decoding process. The flag information may be set in a picture parameter set (PPS) and transmitted to the decoder. Alternatively, the flag information may be set in a sequence parameter set (SPS) or a slice header and transmitted to the decoder.

The process of performing decoding according to the present invention is summarized as follows.

1 step: a current TU size is compared with a Log2MaxTrafoSizeSkip value.

2 step: If the current TU size is equal to or smaller than the Log2MaxTrafoSizeSkip value, the following is performed.

2-1 step: a flag indicative of whether or not to skip inverse transform is read from compressed image data.

2-2 step: if the flag is 1, inverse transform is not performed 2-3 step: if the flag is 0, inverse transform is performed 3 step: If the current TU size is greater than the Log2MaxTrafoSizeSkip size 3-1 step: inverse transform is performed (a flag indicative of whether execution or skip of inverse transform is not read from compressed image data).

In order to perform the decoding process of the present invention, the following execution process may be additionally performed.

transform_skip_enabled_flag is read from picture_parameter_set. If transform_skip_enabled_flag=1, log 2_max_transform_skip_block_size_minus2 is additionally read. Furthermore, the following process is performed.

Log2MaxTrafoSizeSkip=log 2_max_transform_skip_block_size_minus2+2

As another realization example for performing the decoding process of the present invention, the following execution process may be performed.

TABLE 8

Sequence_parameter_set
...
log2_max_transform_skip_block_size_minus2
...

log 2_max_transform_skip_block_size_minus2 is read from sequence_parameter_set. Furthermore, transform_skip_enabled_flag is read from picture_parameter_set. Thereafter, the following process is performed.

if(transform_skip_enabled_flag)

Log2MaxTrafoSizeSkip=log 2_max_transform_skip_block_size_minus2+2 else

Log2MaxTrafoSizeSkip=2

Although the some embodiments of the present invention have been illustrated above, those skilled in the art will appreciate that the present invention may be modified in various ways without departing from the technical contents and scope of the present invention defined in the appended claims. Accordingly, the future changes of the embodiments of the present invention will not depart from the technology of the present invention.

What is claimed is:

1. An image encoding method, comprising steps of:
   determining a maximum transform skip block size;
   comparing a current transform unit (TU) size with a value of the maximum transform skip block size;

determining whether or not to skip transform based on comparison information between the TU size and the value of the maximum transform skip block size; and encoding information indicative of the value of the maximum transform skip block size, wherein if the current TU size is equal to or smaller than the value of the maximum transform skip block size, whether or not to skip transform is determined, and a flag indicative of a determination of whether or not to skip transform is included in a bit stream and encoded, and wherein the information indicative of the value of the maximum transform skip block size is encoded as a logarithm value of the maximum transform skip block size minus 2.

2. The image encoding method of claim 1, wherein the information indicative of the value of the maximum transform skip block size is transmitted in a higher layer than residual coding data transmission.

3. The image encoding method of claim 2, wherein the higher layer comprises a picture parameter set.

4. The image encoding method of claim 2, wherein the higher layer comprises at least one of a sequence parameter set and a slice header.

5. The image encoding method of claim 1, wherein if a flag indicative of whether a transform execution skip function itself is used is enabled, both transform and quantization are not determined to be not used in a coding unit (CU) level, and the current TU size is equal to or smaller than the value of the maximum transform skip block size, whether or not to skip transform is determined, and a flag indicative of a determination of whether or not to skip transform is included in the bit stream and encoded.

6. The image encoding method of claim 1, wherein if the current TU size is greater than the value of the maximum transform skip block size, transform is determined to be performed on the current transform block without generating a flag indicative of whether or not to skip transform.

7. The image encoding method of claim 1, further comprising a step of performing transform on the current transform block based on the determined transform method.

8. An image decoding method, comprising steps of:

obtaining information indicative of a value of a maximum transform skip block size from a bitstream;

comparing a current transform unit (TU) size and the value of the maximum transform skip block size; and determining whether or not to skip inverse transform for a current transform block based on comparison information between the TU size and the value of the maximum transform skip block size, wherein the current TU size is equal to or smaller than the value of the maximum transform skip block size, a flag indicative of whether or not to skip inverse transform is read, and inverse transform is performed or an execution of inverse transform is skipped based on a value of the flag, and wherein the information indicative of the value of the maximum transform skip block size is encoded as a logarithm value of the maximum transform skip block size minus 2.

9. The image decoding method of claim 8, wherein the information indicative of the value of the maximum transform skip block size is received in a higher layer than residual coding data transmission.

10. The image decoding method of claim 9, wherein the higher layer comprises a picture parameter set.

11. The image decoding method of claim 9, wherein the higher layer comprises at least one of a sequence parameter set and a slice header.

12. The image decoding method of claim 8, wherein if a flag indicative of whether an inverse transform execution skip function itself is used is enabled, both inverse transform and inverse quantization are not determined to be not used in a coding unit (CU) level, and the current TU size is equal to or smaller than the value of the maximum transform skip block size, a flag indicative of whether or not to skip inverse transform is read, and inverse transform is performed or an execution of inverse transform is skipped based on a value of the flag.

13. The image decoding method of claim 8, wherein if the current TU size is greater than the value of the maximum transform skip block size, a flag indicative of whether or not to skip inverse transform is not read, and inverse transform is performed on the current inverse transform block.

14. The image decoding method of claim 8, further comprising a step of performing inverse transform on the current transform block based on the determined inverse transform method.

* * * * *